United States Patent
Lee et al.

(10) Patent No.: US 11,945,308 B2
(45) Date of Patent: Apr. 2, 2024

(54) SPATIAL IMAGE CLUSTER FOR VEHICLE

(71) Applicant: LG ELECTRONICS INC., Seoul (KR)

(72) Inventors: Yong Uk Lee, Seoul (KR); Kyung Lack Kim, Seoul (KR); Ki Hoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/773,781

(22) PCT Filed: Nov. 1, 2019

(86) PCT No.: PCT/KR2019/014739
§ 371 (c)(1),
(2) Date: May 2, 2022

(87) PCT Pub. No.: WO2021/085695
PCT Pub. Date: May 6, 2021

(65) Prior Publication Data
US 2022/0379726 A1    Dec. 1, 2022

(51) Int. Cl.
*B60K 35/00*    (2006.01)
*G02B 3/00*    (2006.01)
(Continued)

(52) U.S. Cl.
CPC ........... *B60K 35/00* (2013.01); *H04N 13/302* (2018.05); *H04N 13/324* (2018.05);
(Continued)

(58) Field of Classification Search
CPC .............. B60K 35/00; B60K 2370/143; B60K 2370/152; B60K 2370/1531;
(Continued)

(56) References Cited

U.S. PATENT DOCUMENTS

2007/0008617 A1\* 1/2007 Shestak ................ H04N 13/359
359/455
2008/0279541 A1\* 11/2008 Montgomery ............ F21V 5/04
362/555
(Continued)

FOREIGN PATENT DOCUMENTS

DE    102010055144 A1 \*   6/2012 ............. B60K 35/00
JP      2010256550         11/2010
(Continued)

OTHER PUBLICATIONS

PCT International Application No. PCT/KR2019/014739, International Search Report dated Jul. 23, 2020, 4 pages.

*Primary Examiner* — Douglas M Wilson
(74) *Attorney, Agent, or Firm* — LEE, HONG, DEGERMAN, KANG & WAIMEY (57)    ABSTRACT

A cluster according to an embodiment of the disclosure includes a display and a spatial image panel. The display is installed in the vehicle to output predetermined information as a 2D image. The spatial image panel is configured to output a 3D image in a predetermined space in front. The spatial image panel includes a first lens array, a second lens array, and a refractive medium. The first lens array is disposed adjacent to the display and includes a plurality of first lenses arranged on the same plane. The second lens array is disposed in parallel with the first array so that the first lenses and second lenses overlap each other. The refractive medium is disposed between the first lens array and the second lens array.

15 Claims, 11 Drawing Sheets

(51) Int. Cl.
| | |
|---|---|
| *G02B 26/08* | (2006.01) |
| *G02B 27/09* | (2006.01) |
| *G02B 30/40* | (2020.01) |
| *G02B 30/56* | (2020.01) |
| *G02F 1/1335* | (2006.01) |
| *G09G 3/00* | (2006.01) |
| *H04N 13/302* | (2018.01) |
| *H04N 13/322* | (2018.01) |
| *H04N 13/324* | (2018.01) |
| *H04N 13/366* | (2018.01) |
| *G02B 3/14* | (2006.01) |
| *G02B 30/25* | (2020.01) |

(52) U.S. Cl.
CPC ..... *H04N 13/366* (2018.05); *B60K 2370/143* (2019.05); *B60K 2370/152* (2019.05); *B60K 2370/1531* (2019.05); *B60K 2370/29* (2019.05); *B60K 2370/347* (2019.05); *G02B 3/0056* (2013.01); *G02B 3/0062* (2013.01); *G02B 3/14* (2013.01); *G02B 26/0875* (2013.01); *G02B 27/0961* (2013.01); *G02B 30/25* (2020.01); *G02B 30/40* (2020.01); *G02B 30/56* (2020.01); *G02F 1/133526* (2013.01); *G09G 3/003* (2013.01); *G09G 2380/10* (2013.01); *H04N 13/322* (2018.05)

(58) Field of Classification Search
CPC .......... B60K 2370/347; B60K 2370/29; H04N 13/302; H04N 13/324; H04N 13/366; H04N 13/322; H04N 13/361; G02B 3/0056; G02B 3/14; G02B 26/0875; G02B 27/0093; G02B 30/40; G02B 3/0062; G02B 27/0961; G02B 30/56; G02B 30/25; G03H 2223/19; G09G 3/003; G09G 2380/10; G02F 1/133526
See application file for complete search history.

(56) References Cited

U.S. PATENT DOCUMENTS

| | | | |
|---|---|---|---|
| 2009/0231698 A1* | 9/2009 | Hashimoto | G02B 30/56 |
| | | | 359/476 |
| 2012/0320292 A1* | 12/2012 | Guo | G02F 1/1362 |
| | | | 349/123 |
| 2017/0293152 A1 | 10/2017 | Zha | |
| 2017/0357090 A1* | 12/2017 | Martinez | G02B 27/0172 |

FOREIGN PATENT DOCUMENTS

| | | |
|---|---|---|
| JP | 2017107131 | 6/2017 |
| KR | 1020060055040 | 5/2006 |
| KR | 100916655 | 9/2009 |
| KR | 101122199 | 2/2012 |
| KR | 1020140130802 | 11/2014 |
| KR | 101973995 | 4/2019 |

* cited by examiner

SPATIAL IMAGE CLUSTER FOR VEHICLE

CROSS-REFERENCE TO RELATED APPLICATIONS

This application is the National Stage filing under 35 U.S.C. 371 of International Application No. PCT/KR2019/014739, filed on Nov. 1, 2019, the contents of which are all incorporated by reference herein in their entirety.

FIELD

The disclosure relates to a cluster of a vehicle and, more specifically, to a spatial image cluster configured to display 3D information between a cluster and a driver.

BACKGROUND

In general, a cluster is installed on the driving seat of a vehicle. The cluster outputs and shows predetermined information to a driver. Conventional clusters are classified into two types (analog and digital types).

In the analog type, an indicator needle moves and displays the vehicle's RPM, speed, traveling distance, and the like. The digital type is implemented in various forms in line with development of screen display devices, and has been continuously improved to provide improved visual information to drivers.

However, conventional clusters can only express 2D information on a predetermined plane, although there is a difference in type (analog or digital). Digital-type clusters provide improved visual information in line with development of screen display devices, but a limited amount of information can be displayed in a predetermined area in a 2D format.

In this connection, there have been technical attempts to reflect and display information on the windshield of a car, such as head-up display (HUD), but the amount of information that can be display is still limited, and there is a shortcoming in that visibility changes depending on the amount of external light.

Registered Korean Patent Publication No. 10-1973995 discloses a technology related thereto, entitled "DISPLAY DEVICE AND VEHICLE INCLUDING SAME" (hereinafter, referred to as Related Technology 1).

According to Related Technology 1, the depth of display of images inside a main screen is adjusted such that partially-output images have stereoscopic impression. However, the main screen according to Related Technology 1 has a structural limitation in that the size thereof is limited, and the outputted information depends on the main screen size. therefore, there are shortcomings in that information that can be displayed is limited, and images displayed at different depths inside the main screen during driving make the driver feel dizzy.

In addition, Registered Korean Patent Publication No. 10-0916655 discloses a "stereoscopic dashboard" (hereinafter, referred to as Related Technology 2). Related Technology 2 is related to a vehicle dashboard, and images output through the dashboard pass through a prism and a projection plate and are provided to the user in a hologram type. The stereoscopic dashboard according to Related Technology 2 has a problem in that a device having a large volume is necessary to generate stereoscopic information. Moreover, images of stereoscopic images generated in a running car easily fatigue the driver's eyes.

The above-described related technologies correspond to technological information which has been held by inventors for the disclosure, or which has been acquired in the course of deriving the disclosure, and are not necessarily deemed to be widely-known technologies that have been made public prior to filing of the disclosure.

SUMMARY

It is an aspect of the disclosure to solve the problems occurring in the prior art in that information output through a vehicle cluster is limited to a plane, and needs to be expressed within a designated cluster size.

It is another aspect of the disclosure to solve the problems occurring in the prior art in that, when stereoscopic images are output to a vehicle cluster, afterimages or vibrations make the driver feel dizzy.

It is an aspect of the disclosure to solve the problems occurring in the prior art in that, although an information output scheme (for example, HUD) is used such that the user can identify vehicle driving information without lowering the head, visibility is heavily changed depending on the peripheral brightness.

It is an aspect of the disclosure to solve the problems occurring in the prior art in that the user needs to move the gaze to a designated cluster screen in order to identify driving information, and the driver's gaze is thus distracted.

It is an aspect of the disclosure to solve the problems occurring in the prior art in that the user is unable to choose the manner of display of information output from the cluster.

Aspects of the disclosure are not limited to the above-mentioned aspects, and other aspects not mentioned herein will be understood from the following description.

A cluster according to an embodiment of the disclosure includes a display and a spatial image panel. The display is configured to be installed in a vehicle and to output predetermined information as a 2D image. The spatial image panel is configured to output a 3D image in a predetermined space in front.

The spatial image panel includes a first lens array, a second lens array, and a refractive medium. The first lens array is disposed adjacent to the display and includes a plurality of first lenses arranged on the same plane. The second lens array is disposed in parallel with the first array so that the first lenses and second lenses overlap each other. The refractive medium is disposed between the first lens array and the second lens array.

In the cluster according to an embodiment of the disclosure, the first lenses and the second lenses are spaced apart from each other by the same distance.

In the cluster according to an embodiment of the disclosure, the first lens array and the second lens array are disposed inside the refractive medium.

In the cluster according to an embodiment of the disclosure, the spacing in which the spatial image panel is configured to be spaced apart from the display is adjusted.

In the cluster according to an embodiment of the disclosure, the spatial image panel includes a rail and a sliding unit. The rail extends straight in one direction. The sliding unit is configured to move along the rail in a state in which the first lens array and the second lens array are fixed.

In the cluster according to an embodiment of the disclosure, the rail has a thread formed on the outer periphery thereof, and the sliding unit is configured to move along a longitudinal direction of the rail when the rail rotates.

In the cluster according to an embodiment of the disclosure, the spatial image panel is configured to transmit only a predetermined portion of the image output from the display and output the image as a 3D image.

In the cluster according to an embodiment of the disclosure, the spatial image panel is configured to selectively transmit a predetermined portion of the image output from the display and output the image as a 3D image.

The cluster according to an embodiment of the disclosure further includes an air touch sensor configured to detect a user's body approaching the 3D image output through the spatial image panel.

In the cluster according to an embodiment of the disclosure, the air touch sensor detects a user's touch performed in a predetermined area of the 3D image output through the spatial image panel.

In the cluster according to an embodiment of the disclosure, in the air touch sensor, a color of an area where the user's touch is detected in the 3D image output through the spatial image panel is changed to a predetermined color.

In the cluster according to an embodiment of the disclosure, the spatial image panel includes a switching layer configured to be embedded in the first lens array and to change a refection direction of transmitted light according to the intensity of an applied current.

In the cluster according to an embodiment of the disclosure, by adjusting the intensity of the current applied to the switching layer, the image output through the spatial image panel is selected as either a 2D image or a 3D image.

A cluster according to an embodiment of the disclosure includes a display and a spatial image panel. The distance in which the spatial image panel is spaced apart from the display is adjusted.

In the cluster according to an embodiment of the disclosure, the spatial image panel is linked to a driving speed of the vehicle to adjust the distance to the display.

The disclosure is advantageous in that stereoscopic output images are generated by using a thin display and a spatial image panel such that a cluster can be installed in a narrow space, thereby improving space utilization.

The disclosure is advantageous in that a spatial image panel generates stereoscopic output images by using a first lens array and a second lens array such that clear stereoscopic output images can be provided, the driver does not fee dizzy, and eye fatigue is reduced.

The disclosure is advantageous in that stereoscopic images projected onto a spatial image panel are output in a predetermined space, stereoscopic output images are made on the basis of images output from a display, and output images accordingly maintain a relatively high level of visibility while being less affected by ambient brightness.

The disclosure is advantageous in that the distance between the spatial image panel and the display is adjustable such that the size or content of stereoscopic output images can be adjusted according to the driver's settings.

The disclosure is advantageous in that an air touch sensor is provided such that a predetermined vehicle function can be easily controlled by the driver's touch of stereoscopic images.

Advantageous effects of the disclosure are not limited to the above-mentioned advantageous effects, and other advantageous effects not mentioned herein will be clearly understood from the following description by those skilled in the art.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Hereinafter, in order to describe the disclosure, embodiments according to the disclosure will be described in more detail with reference to the accompanying drawings. Like reference numerals refer to like elements throughout the detailed description.

Figure 1:
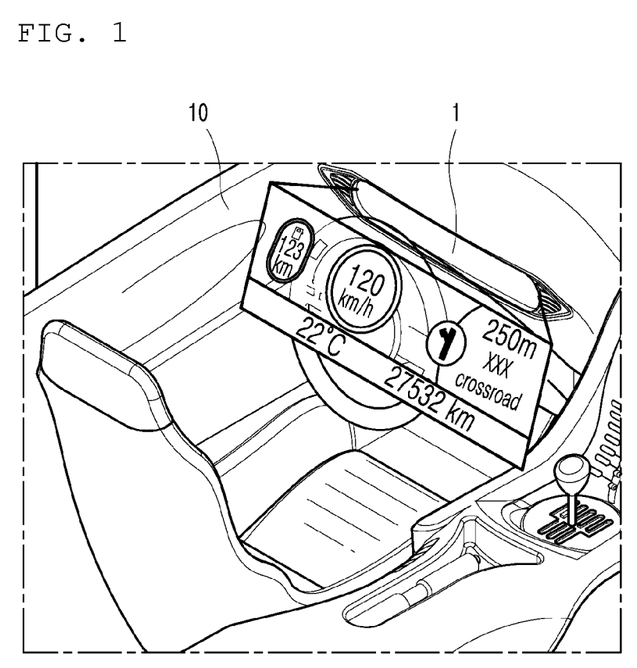
FIG. 1 is a diagram illustrating a state in which a cluster is installed in a vehicle according to an embodiment of the disclosure.
Figure 2:
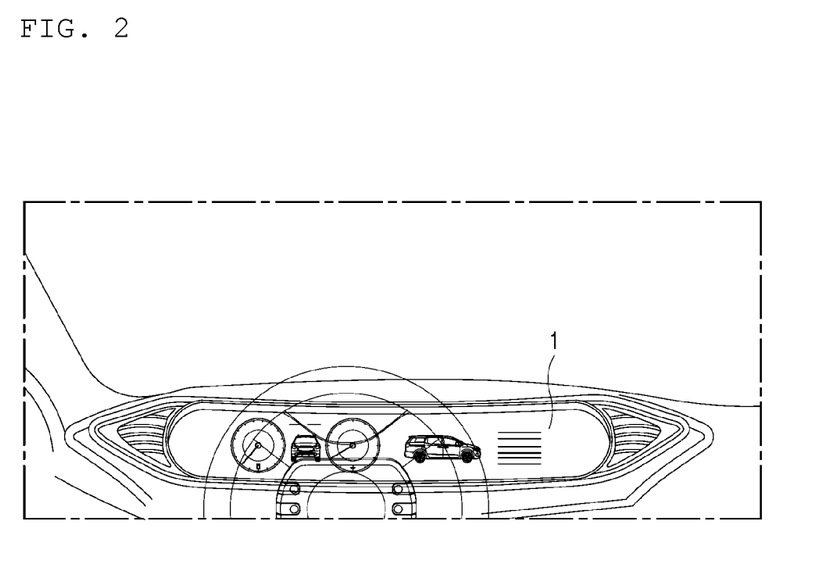
FIG. 2 is a diagram illustrating a state in which a cluster is installed in a vehicle according to an embodiment of the disclosure from a driver's point of view.

FIG. 1 is a diagram illustrating a state in which a cluster 1 is installed in a vehicle according to an embodiment of the disclosure. FIG. 2 is a diagram illustrating a state in which the cluster 1 is installed in a vehicle according to an embodiment of the disclosure from a driver's point of view.

As shown in FIGS. 1 and 2, the cluster 1 according to an embodiment of the disclosure is installed inside a vehicle body. Specifically, the cluster 1 may be installed in front of the driver. This is an example, and the cluster 1 according to an embodiment of the disclosure is not limited to be installed at a specific location inside the vehicle.

The cluster 1 according to an embodiment of the disclosure may output a variety of information such as RPM, driving speed, fuel efficiency, fuel amount, and mileage of the vehicle. The cluster 1 according to an embodiment of the disclosure outputs predetermined information as a 3D image in a specific space between the driver and the cluster 1.

That is, the image information output through the cluster 1 may have a form of the 3D image output in the specific space.

An interface of a specific 3D image may be implemented in an appropriate form according to an embodiment to which the disclosure is applied.

In an embodiment of the disclosure, a case in which the cluster 1 is positioned in front of the driver will be described as an example.

Figure 3:
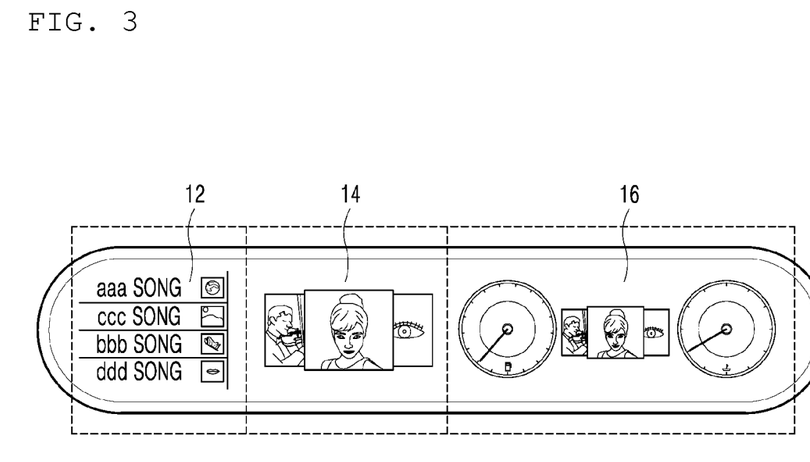
FIG. 3 is a front view illustrating a cluster according to an embodiment of the disclosure.
Figure 4:
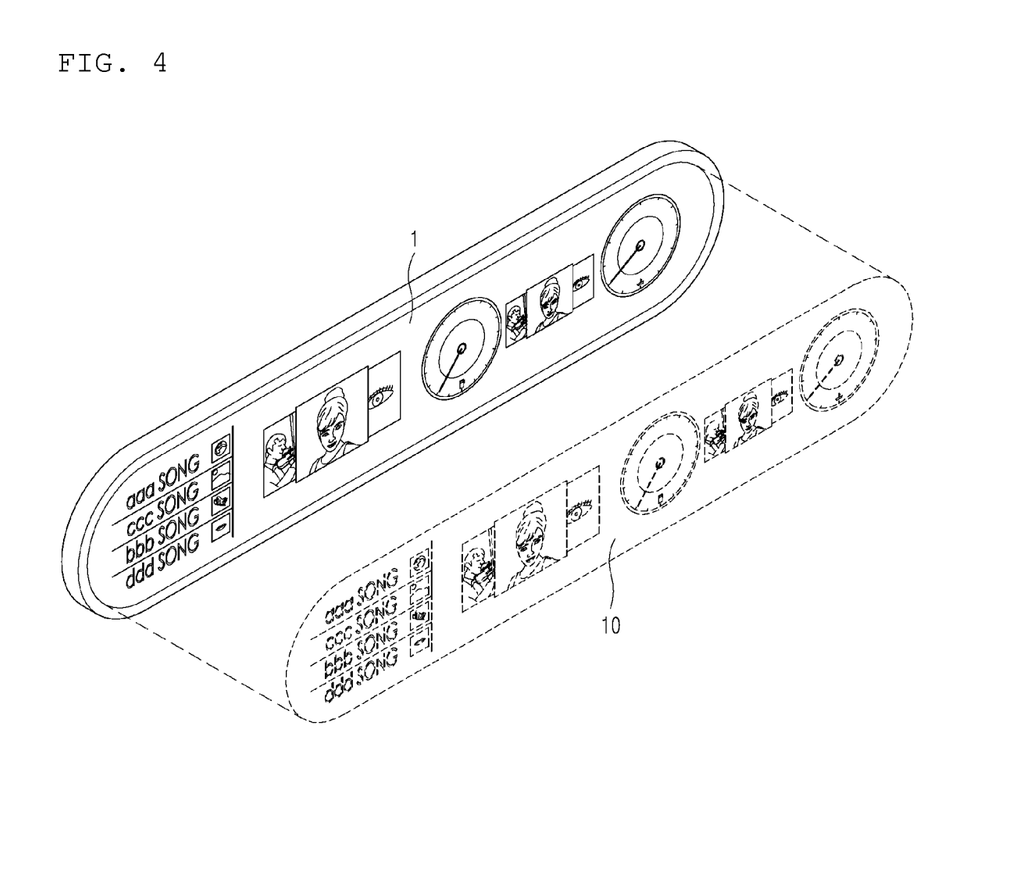
FIG. 4 is a perspective view illustrating a cluster according to an embodiment of the disclosure.

FIG. 3 is a front view illustrating the cluster 1 according to an embodiment of the disclosure, and FIG. 4 is a perspective view illustrating the cluster 1 according to an embodiment of the disclosure.

As shown in FIGS. 3 and 4, the cluster 1 according to an embodiment of the disclosure forms an output image 10 that is a 3D image in front of the cluster 1 in such a manner that the output image 10 is spaced apart from the cluster 1. The output image 10 is obtained by converting a 2D image output through the cluster 1. When information expressed in the cluster 1 is referred to as information of a first area 12, a second area 14, and a third area 16 for convenience, only an area configured in advance by the user may be output as the output image 10 that is a 3D image. That is, the area of the information output through the cluster 1 may be divided into a plurality of areas such as the first area 12 to the third area 16. Each of the divided areas may be output as a 2D or 3D image by a user's selection.

Figure 5:
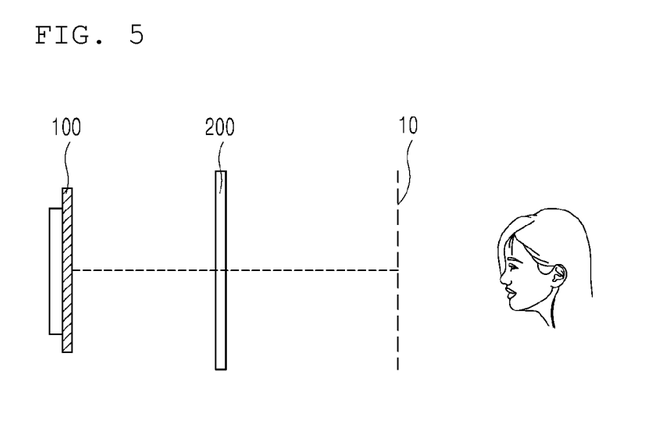
FIG. 5 is a diagram illustrating the principle of a cluster according to an embodiment of the disclosure.
Figure 6:
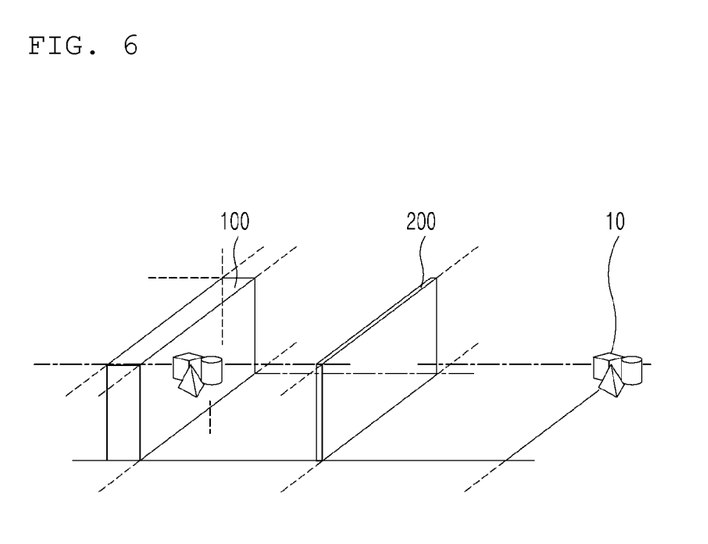
FIG. 6 is a conceptual diagram illustrating the principle of a cluster according to an embodiment of the disclosure.
Figure 7:
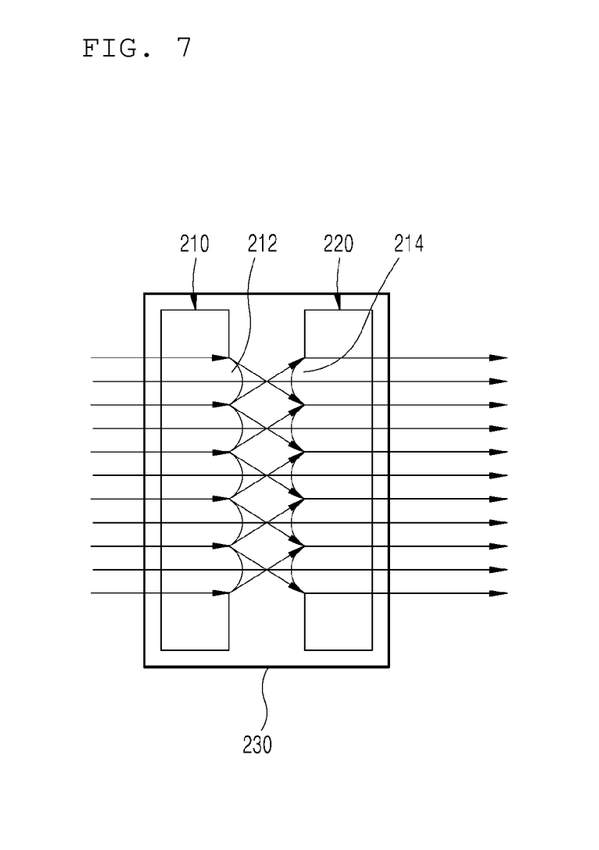
FIG. 7 is a cross-sectional view illustrating a structure of a spatial image panel in a cluster according to an embodiment of the disclosure.

FIG. 5 is a diagram illustrating the principle of the cluster 1 according to an embodiment of the disclosure, FIG. 6 is a conceptual diagram illustrating the principle of the cluster 1 according to an embodiment of the disclosure, and FIG. 7 is a cross-sectional view illustrating a structure of a spatial image panel 200 in the cluster 1 according to an embodiment of the disclosure.

As shown in FIGS. 5 to 7, the cluster 1 according to an embodiment of the disclosure includes a display 100 and a spatial image panel 200. The display 100 may be implemented as various types of screen display devices. In an embodiment of the disclosure, the display 100 may be an LCD or OLED display 100.

The display 100 may be constituted of a screen that outputs a 2D image or a set of light sources. The spatial image panel 200 is disposed in front of the display 100 and transmits an image output through the display 100 to output the transmitted image as a 3D image in a predetermined space.

In an embodiment of the disclosure, the spatial image panel 200 may be constituted of a micro-lens array (MLA).

The spatial image panel 200 includes a first lens array 210, a second lens array 220, and a refractive medium 230. The first lens array 210 is provided by disposing first lenses 212 in a predetermined pattern. The second lens array 220 is provided by disposing second lens 214 in a predetermined pattern. The first lens 212 and the second lens 214 correspond one-to-one, respectively, and are positioned so that light passing through the first lens 212 and the second lens 214 overlaps.

Specifically, the display 100 forms a single plane, and a 2D image is output through one surface of the display 100. In addition, the spatial image panel 200 is also formed as a surface that transmits the 2D image output through one surface of the display 100. The spatial image panel 200 is constituted of the first lens array 210 and the second lens array 220 in which the first lens 212 and the second lens 214 are gathered to form a plane, respectively. The first lens 212 and the second lens 214 included in each of the first lens array 210 and the second lens array 220 are respectively arranged to correspond one-to-one, and light passing through the first lens array 210 and the second lens array 220 overlaps.

The refractive medium 230 is disposed between the first lens array 210 and the second lens array 220. Alternatively, the first lens array 210 and the second lens array 220 may be disposed in a space surrounded by the refractive medium 230. The refractive medium 230 has a refractive index different from that of air. The refraction medium 230 serves to enlarge the viewing angle of light passing between the first lens array 210 and the second lens array 220.

As shown in FIGS. 6 and 7, the 2D image output through the display 100 passes through the first lens array 210, the refractive medium 230, and the second lens array 220. Next, the 2D image passing through the spatial image panel 200 is imaged as a 3D image in front of the spatial image panel 200. The "imaged" means that an image that can be observed through the driver's eyes is formed in a space.

Accordingly, the output image 10 is formed as a 3D image in a space between the cluster 1 and the driver and in a predetermined space. The output image 10 may include information such as a vehicle or environment.

More specifically, the first lens array 210 and the second lens array 220 have the first lenses 212 and the second lenses 214 arranged in the same pattern, respectively. The first lens 212 of the first lens array 210 and the second lens 214 of the second lens array 220 overlap, respectively. The first lens array 210 and the second lens array 220 may be symmetrical to each other with the refractive medium 230 interposed therebetween.

That is, a 2D image is output through one surface of the display 100. The spatial image panel 200 is installed at a predetermined interval on one surface on which the image of the display 100 is output. The 2D image output through one surface of the display 100 passes through the spatial image panel 200 and is output as a 3D image in a predetermined space. In the cluster 1 according to an embodiment of the disclosure, the 3D image output through the spatial image panel 200 is formed in a specific space located between the driver and the cluster provided on the vehicle body.

Figure 8:
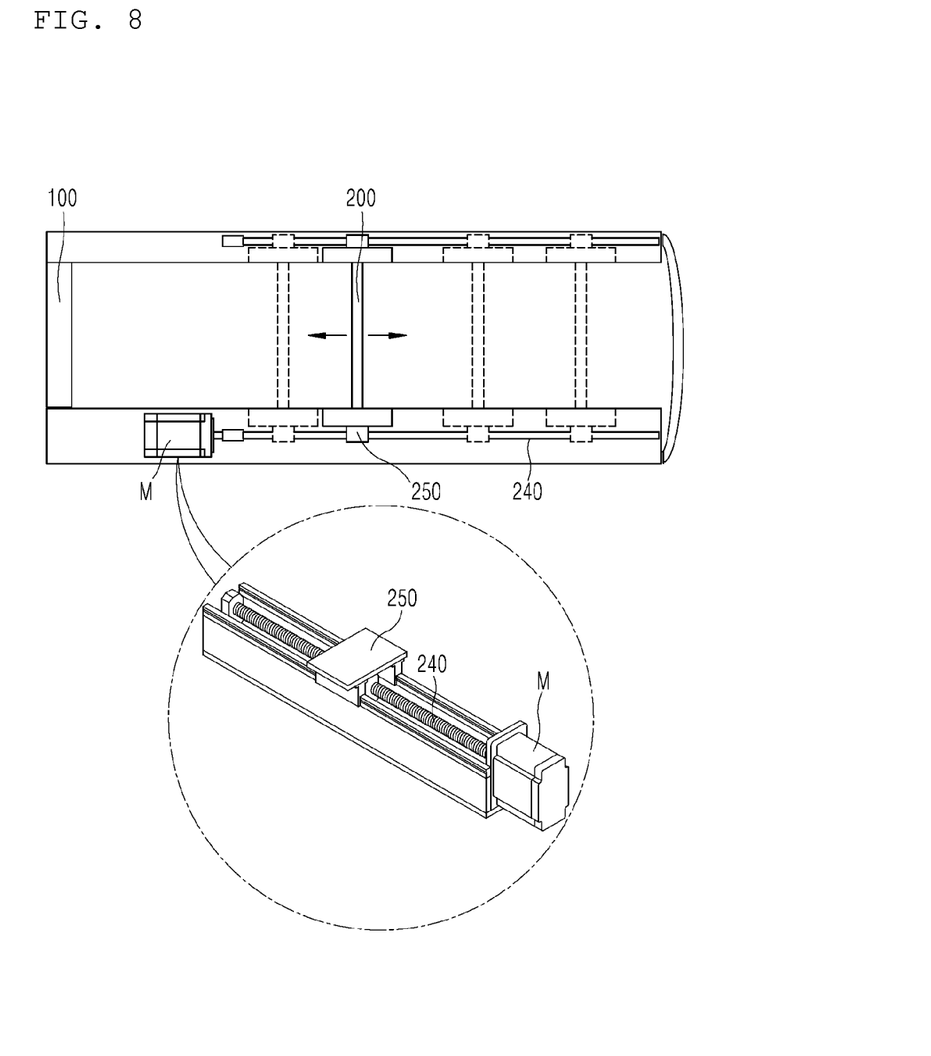
FIG. 8 is a diagram illustrating a rail and a sliding unit provided in a spatial image panel in a cluster according to an embodiment of the disclosure.

FIG. 8 is a diagram illustrating a rail 240 and a sliding unit 250 provided in the spatial image panel 200 in the cluster 1 according to an embodiment of the disclosure.

As shown in FIG. 8, in front of the display 100, the spatial image panel 200 may move away from or closer to the display 100.

Specifically, a rail 240 is provided on one surface on which the 2D image of the display 100 is output, along a direction in which the image is output from the display 100. At least one rail 240 may be provided, and a thread may be formed on the outer periphery of the rail 240.

The sliding unit 250 that is transferred along the longitudinal direction of the rail 240 as the rail 240 rotates is provided. The first lens array 210, the second lens array 220, and the refractive medium 230 may be fixed to the sliding unit 250. That is, the spatial image panel 200 may be fixed to the sliding unit 250.

Accordingly, as the rail 240 rotates, the spatial image panel 200 moves close to or away from the display 100.

When the spatial image panel 200 moves close to the display 100, a position at which a 3D image is formed is provided close to the cluster 1. Conversely, when the spatial image panel 200 moves away from the display 100, the position at which the 3D image is formed moves away from the cluster 1. Accordingly, when the spatial image panel 200 is operated far from the display 100, the driver can see the output image 10 output as the 3D image more closely.

Accordingly, in an embodiment of the disclosure, the spatial image panel 200 may be operated in conjunction with a variable indicating a vehicle state such as a mileage of the vehicle.

Specifically, when the speed of the vehicle is greater than or equal to a predetermined speed, the spatial image panel 200 may be configured to be closer to the display 100. Alternatively, the spatial image panel 200 may be configured to move away from the display 100 when the vehicle speed is less than or equal to a predetermined speed or when the vehicle is placed under a predetermined situation, such as when entering a child protection area.

Through this, by varying the size of the 3D output image 10 that the driver can identify according to the driving situation or state of the vehicle, there is an effect of further enhancing the user's identification.

Figure 9:
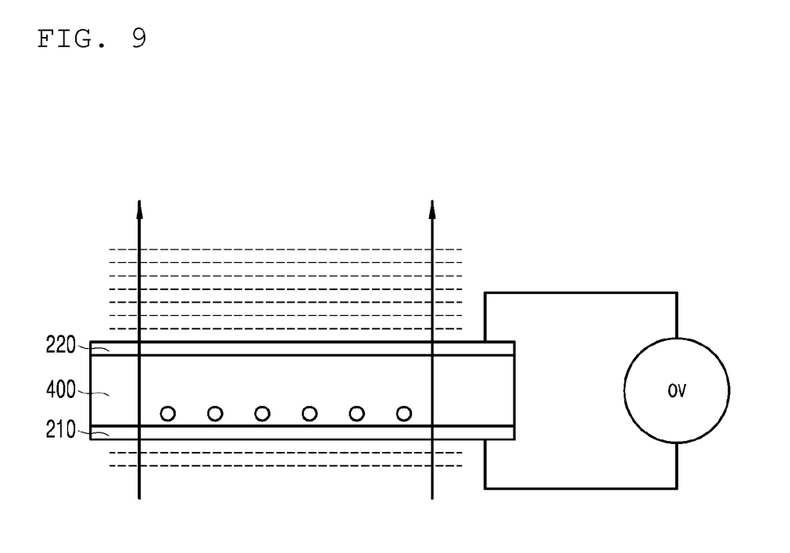
FIG. 9 is a state diagram illustrating a state in which a switching layer transmits light without refraction of the light in a cluster according to an embodiment of the disclosure.
Figure 10:
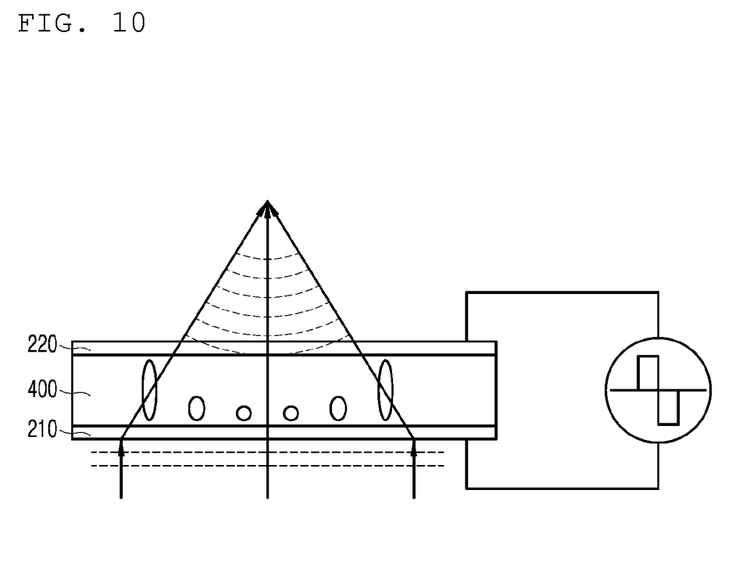
FIG. 10 is a state diagram illustrating a state in which a switching layer refracts and transmits light in a cluster according to an embodiment of the disclosure.

FIG. 9 is a state diagram illustrating a state in which a switching layer 400 transmits light without refraction of the light in the cluster 1 according to an embodiment of the disclosure, and FIG. 10 is a state diagram illustrating a state in which the switching layer 400 refracts and transmits light in the cluster 1 according to an embodiment of the disclosure.

As shown in FIGS. 9 and 10, the cluster 1 according to an embodiment of the disclosure may further include a switching layer 400.

The switching layer 400 may be provided in the form of a panel, and the degree of refraction of transmitted light changes according to the voltage of an applied current. The switching layer 400 may be disposed between the first lens array 210 and the second lens array 220. Alternatively, the switching layer 400 may be disposed between the first lens array 210 and the display 100.

The switching layer 400 directly transmits light as shown in FIG. 9 in a state in which a current of a specific voltage is applied. Accordingly, a 2D image output through the display 100 passes through the spatial image panel 200 to be imaged as a 3D image, and the driver can observe the 3D output image 10 provided in front of the cluster 1.

In addition, when the voltage applied to the switching layer 400 is changed as shown in FIG. 10, the light passing through the switching layer 400 is refracted. Accordingly, the 2D image first output through the display 100 is not converted into the 3D output image 10.

That is, by adjusting the voltage applied to the switching layer 400, a specific portion or the whole of the cluster 1 may selectively output one of 2D or 3D images.

The output 3D image may be a specific area or specific information of the cluster 1 designated by the user as described above. The user can selectively convert the specific area and specific information of the cluster 1 into a 2D or 3D image.

Figure 11:
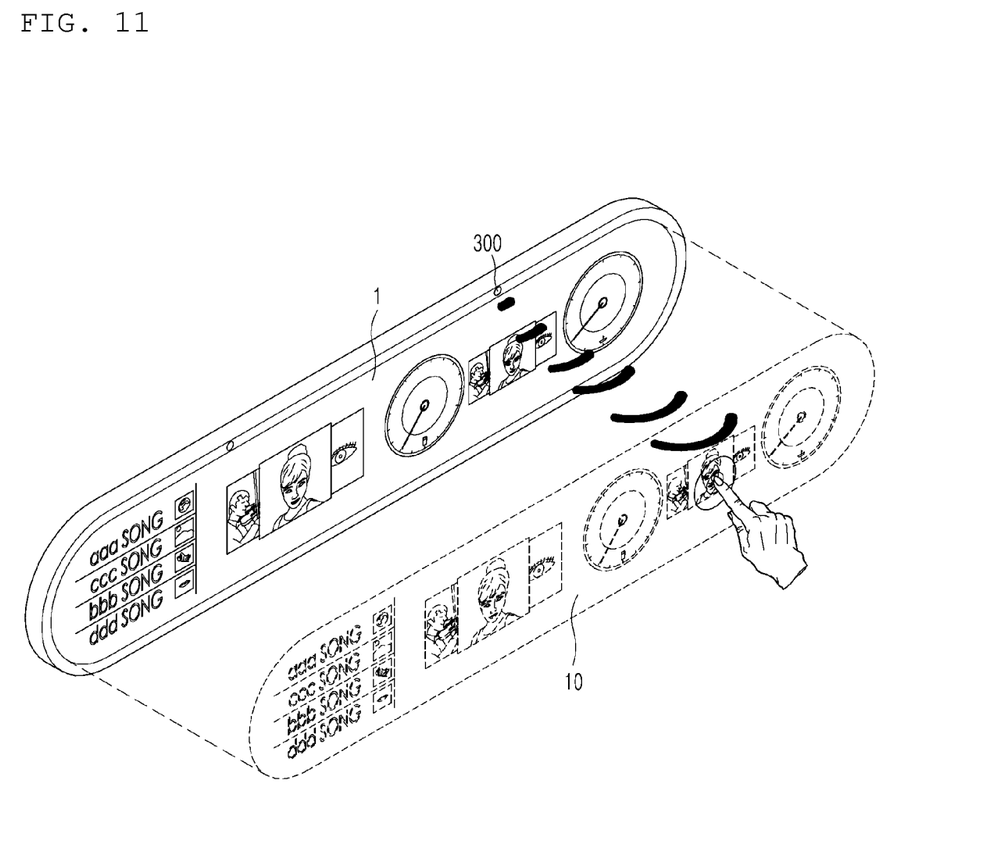
FIG. 11 is a state diagram illustrating a state in which an air touch sensor detects a driver's hand and converts the detected information into an input signal in a cluster according to an embodiment of the disclosure.

FIG. 11 is a state diagram illustrating a state in which an air touch sensor 300 detects a driver's hand and converts the detected information into an input signal in the cluster 1 according to an embodiment of the disclosure.

As shown in FIG. 11, the cluster 1 according to an embodiment of the disclosure further includes an air touch sensor 300. The air touch sensor 300 detects that a predetermined object approaches the front of the cluster 1.

The air touch sensor 300 detects that the driver's hand enters a predetermined space. In addition, the air touch sensor 300 first collects the position of the 3D output image 10 output through the cluster 1, and determines whether the driver's hand approaches the 3D output image 10.

That is, the air touch sensor 300 is interlocked with a controller and transmits object information detected from the front to the controller. Information of the output 3D output image 10, in particular, image-formed position information is stored in the controller. In addition, information for each portion of the output image 10 to be output is stored.

When the user's hand detected through the air touch sensor 300 reaches a specific position of the 3D output image 10, the controller may operate a specific device according to a predetermined configuration.

Specifically, when the driver touches the 3D output image 10 formed on the space, the air touch sensor 300 detects the touch as an input signal, and the controller interprets the input signal and performs an appropriate output.

For example, the above operation may be an operation such as adjusting the size of the 3D output image 10, adjusting the volume of the 3D output image, or adjusting the brightness of the 3D output image 10. Alternatively, the above operation may be implemented in various forms, such as selecting a type of an image to be output.

In the above, embodiments of the disclosure have been described with drawings, which are exemplary and the disclosure is not limited to the above-described embodiments and drawings. It is apparent that those of ordinary skill in the art can modify the embodiments of the disclosure within the scope of the technical idea of the disclosure. In addition, although an action or effect according to the configuration of the disclosure is not explicitly described while describing an embodiment of the disclosure, it is natural that even the effects predictable by the configuration should be recognized.

What is claimed is:

1. A spatial image cluster for a vehicle comprising:
    a display configured to output a 2D image; and
    a spatial image panel disposed in front of the display and configured to selectively output the 2D image as a 3D image, the spatial image panel comprising:
    a first lens array disposed adjacent to the display and comprising a plurality of first lenses arranged on a same plane;
    a second lens array comprising a plurality of second lenses having a same arrangement as the plurality of first lenses of the first lens array such that respective lenses of the plurality of first lenses and the plurality of second lenses are correspondingly aligned;
    a refractive medium configured to be disposed between the first lens array and the second lens array; and
    a switching layer, wherein voltages applied to the switching layer are controllable to change refraction directions of light transmitted by the spatial image panel to selectively output different portions of the 2D image as 2D or 3D,
    wherein the switching layer is embedded in the first lens array and is configured to change a refraction direction of transmitted light according to the applied voltage.

2. The spatial image cluster of claim 1, wherein the plurality of first lenses and the plurality of second lenses are configured to be spaced apart from each other by a same distance.

3. The spatial image cluster of claim 1, wherein a spacing between the spatial image panel and the display is adjustable.

4. The spatial image cluster of claim 3, further comprising a rail and a sliding unit coupled to the spatial image panel and configured to move along the rail to adjust the spacing.

5. The spatial image cluster of claim 4, wherein the sliding unit is coupled to the rail via a screw thread formed on the rail such that the sliding unit is configured to move along a longitudinal direction of the rail in response to rotation of the rail.

6. The spatial image cluster of claim 1, further comprising:
    an air touch sensor configured to detect approach of a user's input to the 3D image output through the spatial image panel.

7. The spatial image cluster of claim 6, wherein the air touch sensor detects a user's touch to the 3D image output through the spatial image panel.

8. The spatial image cluster of claim 7, wherein a color of an area of the 3D image to which the user's touch is detected is changed to a predetermined color.

9. The spatial image cluster of claim 1, wherein the switching layer is provided between the first lens array and the second lens array.

10. The spatial image cluster of claim 1, wherein the switching layer is provided between the first lens array and the display.

11. A spatial image cluster for a vehicle comprising:
a display configured to output a 2D image; and
a spatial image panel disposed in front of the display and configured to selectively output the 2D image as a 3D image, the spatial image panel comprising a first lens array and a second lens array arranged on parallel planes, wherein the first lens array is between the display and the second lens array;
a refractive medium configured to be disposed between the first lens array and the second lens array and
a switching layer, wherein voltages applied to the switching layer are controllable to selectively output different portions of the 2D image as 2D or 3D,
wherein the switching layer is embedded in the first lens array and is configured to change a refraction direction of transmitted light according to the applied voltage.

12. The spatial image cluster of claim 11, wherein a distance between the spatial image panel and the display is adjustable.

13. The spatial image cluster of claim 11, wherein the refractive medium has a different refractive index than air.

14. The spatial image cluster of claim 11, wherein the switching layer is provided between the first lens array and the second lens array.

15. The spatial image cluster of claim 11, wherein the switching layer is provided between the first lens array and the display.

* * * * *